Figure 2:
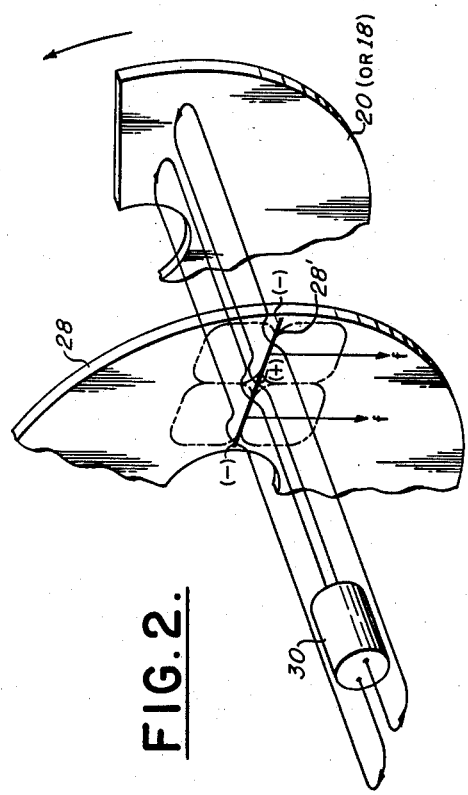

INVENTORS
CHARLES B. REED
CLAIR G. SUTTER
BY

ATTORNEY

United States Patent Office 3,186,211
Patented June 1, 1965

3,186,211
SELF CHECKING GYROSCOPIC APPARATUS
Charles B. Reed and Clair G. Sutter, Phoenix, Ariz., assignors to Sperry Rand Corporation, Great Neck, N.Y., a corporation of Delaware
Filed Nov. 1, 1962, Ser. No. 234,780
9 Claims. (Cl. 73—1)

This invention relates in general to gyroscopic apparatus and more particularly to such apparatus as is capable of testing its own operation. In so testing its operation, apparatus embodying the invention checks rotor rotatability and speed and, in addition, checks the ability of the gyro to produce representative signals for certain input disturbances. With such representative signals produced, the gyro gimbals, bearings, pick-offs, etc., are known to be operative.

Generally, the above gyro checks may be provided simply as follows: A face of the gyro motor perpendicular to the rotor axis of rotation is provided with two adjacent planar semirounds of magnetic material; superimposed on the two semirounds is a conductive ring so positioned as to sandwich the semirounds between the rotor and the ring. Near the conductive ring are two electromagnets the respective fields of which have their axes parallel to the rotor spin axis, such fields being diametrically (with respect to the conductive ring) displaced relative to each other and being located preferably as close to the rotor-support gimbal axis of rotation as possible.

By exciting one electromagnet, the rotor-support gimbal is forced to revolve about its axis in one direction; by exciting the other electromagnet the gimbal revolves about its axis in a counterdirection. Hence, the pick-off for the support gimbal axis produces signals of opposing senses depending on which electromagnet is excited, and then, only if the gyro itself is functioning properly. By examining the current drawn by either electromagnet, the rotor speed of rotation may be determined. That is, the inductive reactance of each electromagnet is varied periodically as the spaces between the semirounds cross the axes of the electromagnet fields. Hence, the currents drawn by the electromagnets are pulse modulated at a frequency representative of the rotor speed of rotation, such modulation being easily detected as is described in more detail later. The manner in which the electromagnet fields cause revolution of the support gimbal will also be described in detail later.

Whereas known gyroscopic self-test features usually require relatively elaborate modifications to equipment for their provision, e.g., separate permanent magnets secured to rotors for speed determination and separate direct gimbal torquers for operability checking, the present invention by way of simplification utilizes the speed checking medium, i.e., magnetic semirounds, to support and enhance the gimbal torquing feature and uses the gimbal torquing currents (which excite the electromagnets) to determine rotor speed.

A principal object of the invention is to provide gyroscopic apparatus capable of checking its own performance.

Another object of the invention is to provide gyroscopic apparatus capable of checking rotor, bearings, gimbal and pick-off operabilities.

Another object of the invention is to provide a rate gyroscope having self-test features.

Another object of the invention is to provide gyroscope test apparatus for testing a gyro without removing it from its installation.

Figure 1:
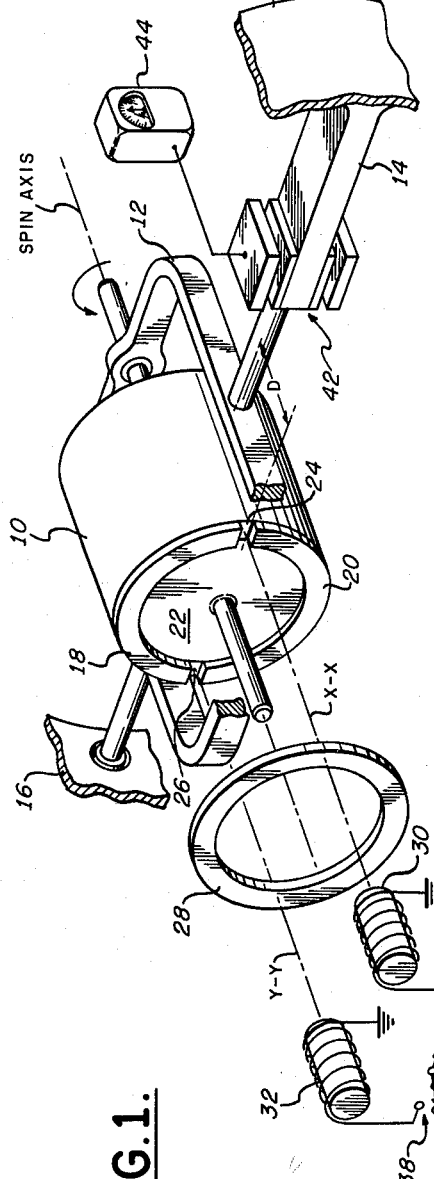

The invention will be described with reference to the figures wherein:

FIG. 1 is a schematic representation of a rate gyroscope embodying the invention, and FIG. 2 is a drawing indicating the cooperation existing between parts of the apparatus of FIG. 1.

While the invention is described incorporated with a rate gyro, it is to be understood that the invention described herein is readily applicable to all forms of gyroscopic apparatus.

Referring now to FIG. 1, a gyro rotor 10 is supported for rotation about an axis designated SPIN AXIS by a gimbal 12. The gimbal 12 in turn connects with a torsion bar 14, the free end of which is rigidly connected to the gyro case 16. The other end of the gimbal 12 is so supported in the case 16 that it is free to rotate about the axis of the torsion bar 14 (but against the torsional stiffness of the bar 14).

Two semirounds 18 and 20 of magnetic material are secured to the end face 22 of the gyro rotor 10, the semirounds 18 and 20 being of such sizes that spaces 24 and 26 are provided between them. A ring 28 of conductive material, e.g., copper, is then overlaid on the magnetic semirounds 18 and 20. For ease of manufacture, it has been found that the rotor 10 may be provided with the semirounds and the conductive ring 28 by plating processes, i.e., two semirounds of iron may be plated on the rotor face 22 and then a ring of copper may be plated on the semirounds.

Aligned so that their respective axes coincide with axes X—X and Y—Y are two electromagnets 30 and 32 fixed rigidly to the gyro case 16. The electromagnets 30 and 32 are each excited by a potential source 34 (either A.C. or D.C.) through respective normally open switches 36 and 38. A frequency meter 40, e.g., the meter shown in either FIG. 25 or FIG. 26, page 277 of "Radio Engineering Handbook," Keith Henney, McGraw-Hill Book Company, Inc., New York, 1950, connects across the D.C. source 34 and responds to variations in the current drawn from the source 34. Secured to the torsion bar 14 is a pick-off 42 which produces signals representing the amounts the gimbal 12 is rotated about its own axis, the signals produced by the pick-off 42 being applied to a meter 44.

By closing the switch 36 to excite the electromagnet 30, the gimbal 12 is caused to rotate about its axis in one direction (if, of course, the rotor 10 is rotating). By closing the switch 38 to excite the electromagnet 32 (instead of the electromagnet 30), the gimbal 12 is caused to rotate about its axis in a counter direction. How this happens will be described below with reference to FIG. 2. Suffice it here to say, however, that gyroscopic precession has nothing to do with the above described rotations of the gimbal 12.

As the rotor 10 rotates the spaces 24 and 26 between the semirounds 18 and 20 periodically cross the axes X—X and Y—Y thereby causing the inductive reactances of the electromagnets 30 and 32 to be cyclically varied in a manner dependent on rotor speed. As a result, the current drawn by each electromagnet is pulse modulated, the modulation being detectable by the frequency meter 40 for determination of the speed of the rotor.

Referring now to FIG. 2, the electromagnet 30 (absent its winding) is shown with its self-produced field passing through the conductive ring 28 to a portion of one of the magnetic semirounds, e.g., the semiround 20. The field lines (flux) then flow through the semiround magnetic material and back through the conductive ring 28 to the electromagnet 30, thereby completing the magnetic circuit. An imaginary conductor 28' is shown perpendicular to and crossing (as the ring 28 rotates) the magnetic flux lines produced by the electromagnet 30. According to Lenz's law, potential differences are developed within the conductive ring 28 by such relative motion between conductor and field, thereby causing eddy currents to be created as shown by the dashed lines within the portion of the ring 28. The flux lines produced by the electromagnet 30 symbolically are shown being bent as the conductor 28' crosses through them, the result being that forces *f* are exerted downwardly on the conductor 28'. The forces exerted on the conductor 28' act through lever arms of lengths equal to the distance D shown on FIG. 1. As a result the torsion bar 14 twists clockwise, as viewed from the left in FIG. 1, when the electromagnet 30 is excited.

By exciting the electromagnet 32 the opposite will take place, namely, that upward forces will be exerted on the gimbal 12, thereby causing the gimbal to rotate so that the torsion bar 14 twists counterclockwise, when viewed from the left in FIG. 1.

In view of what has been stated above, gimbal rotatability, pick-off operativeness, and rotor rotatability can all be checked by closing first the switch 36 and then the switch 38, the indicator 44 having its pointer move first in one direction and then in an opposite direction depending on which switch is closed. To check rotor speed, examination need be made only of the meter 40 (with either switch 36 or 38 closed).

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Gyroscopic apparatus comprising gimbal means, a rotor supported for rotation by said gimbal means, magnetic material placed in a discrete location on said rotor at a place spaced from the rotor axis of rotation, whereby the reluctance at any point near the rotor is varied periodically as said rotor rotates, conductive material supported by the rotor and disposed to sandwich the magnetic material between the rotor and the conductive material, and electromagnet means the field of which has its axis substantially parallel to but radially displaced from the rotor spin axis, said electromagnet field axis being substantially in a plane other than the plane of the rotor spin axis which is perpendicular to the gimbal axis of rotation, said electromagnet means being adjacent the rotor face having the magnetic material secured thereto whereby excitation of said electromagnet means exerts a torque which tends to rotate the rotor about an axis perpendicular to its spin axis and the current drawn by the electromagnet means is modulated as a function of the rotor speed about its spin axis.

2. Gyroscopic apparatus comprising gimbal means, a rotor supported for rotation by said gimbal means, magnetic material placed in a discrete location on said rotor at a place spaced from the rotor axis of rotation, whereby the reluctance at any point near the rotor is varied periodically as said rotor rotates, conductive material supported by the rotor and disposed to sandwich the magnetic material between the rotor and the conductive material, and first and second electromagnet means the fields of which both have their axes substantially parallel to the rotor spin axis but diametrically displaced with respect to the rotor spin axes, said electromagnet field axes being both substantially in planes other than the plane of the rotor spin axis which is perpendicular to the gimbal axis of rotation, said electromagnet means being adjacent the rotor face having the magnetic material secured thereto, whereby excitation of respective electromagnets exerts torques which tend to rotate the rotor about an axis perpendicular its spin axis in counter directions, the current being modulated when said rotor rotates at a frequency indicative of the rotor rotational speed.

3. Self-checking gyroscope apparatus comprising gimbal means, a rotor supported for rotation by said gimbal means, two semirounds of magnetic material secured to said rotor and so spaced from the rotor axis of rotation that the permeance in the vicinity of the rotor is cyclically varied when the rotor rotates, a ring of conductive material superimposed on the semirounds, first and second electromagnet means the fields of which both have their axes substantially parallel to the rotor spin axis and diametrically displaced with respect to the rotor spin axis, said electromagnet field axes being both substantially in planes other than the plane of the rotor spin axis which is perpendicular to the gimbal axis of rotation, said electromagnet means being adjacent the rotor face having the magnetic material secured thereto, whereby excitation of respective electromagnets exerts torques which tend to rotate the rotor about an axis perpendicular its spin axis in counter directions, the current being drawn by the electromagnets being modulated when said rotor rotates at a frequency indicative of the rotor rotational speed.

4. Gyroscopic apparatus having self test features comprising gimbal means, a rotor supported for rotation by said gimbal means, a plating of magnetic material on said rotor and discretely located in spaced apart relationship with the rotor axis of rotation whereby the reluctance at any point near the rotor varies cyclically as said rotor rotates, a plating of conductive material atop the plating of magnetic material so as to sandwich the magnetic material between the conductive plating and the rotor, and electromagnet means the field of which has its axis substantially parallel to but radially displaced from the rotor, said electromagnet field axis being substantially in a plane other than the plane of the rotor spin axis which is perpendicular to the gimbal axis of rotation, said electromagnet means being adjacent the rotor face having the magnetic material plating thereon whereby excitation of said electromagnet means exerts a torque which tends to rotate the rotor about an axis perpendicular its spin axis and the current drawn by the electromagnet means is modulated as a function of the rotor speed about its axis.

5. Gyroscopic apparatus having self test features comprising gimbal means, a rotor supported for rotation by said gimbal means, a plating of magnetic material on said rotor and discretely located in spaced apart relationship with the rotor axis of rotation whereby the reluctance at any point near the rotor varies cyclically as said rotor rotates, a plating of conductive material atop the plating of magnetic material so as to sandwich the magnetic material between the conductive plating and the rotor, and first and second electromagnet means the fields of which both have their axes substantially parallel to the rotor spin axis but diametrically displaced with respect to the rotor spin axis, said electromagnet field axes being both substantially in planes other than the plane of the rotor spin axis which is perpendicular to the gimbal axis of rotation, said electromagnet means being adjacent the rotor face having the magnetic material plated thereon, whereby excitation of respective electromagnets exerts torques which tend to rotate the rotor about an axis perpendicular its spin axis in counter directions, the current being drawn by the electromagnets being modulated when said rotor rotates at a frequency indicative of the rotor rotational speed.

6. Self-checking gyroscope apparatus comprising gimbal means, a rotor supported for rotation by said gimbal means, two semirounds of magnetic material plated on said rotor at discrete locations in respective spaced apart relationship with the rotor axis of rotation, whereby the permeance in the vicinity of the rotor is cyclically varied when the rotor rotates, a ring of conductive material plated on the semirounds, first and second electromagnet means the fields of which both have their axes substantially parallel to the rotor spin axis and diametrically displaced with respect to the rotor spin axis, said electromagnet field axes being both substantially in planes other than the plane of the rotor spin axis which is perpendicular to the gimbal axis of rotation, said electromagnet means being adjacent the rotor face having the magnetic material sefree to rotate, a rotor supported for rotation by said gimbal secured thereto, whereby excitation of respective electromagnets exerts torques which tend to rotate the rotor about an axis perpendicular its spin axis in counter directions, the current being drawn by the electromagnets being modulated when said rotor rotates at a frequency indicative of the rotor rotational speed.

7. A rate gyroscope with self test features comprising gimbal means, a bar connected to said gimbal means having torsional stiffness against which said gimbal means is free to rotate, magnetic material placed in a discrete location on said rotor at a place spaced from the rotor axis of rotation, whereby the reluctance at any point near the rotor is varied periodically as said rotor rotates, conductive material supported by the rotor and disposed to sandwich the magnetic material between the rotor and the conductive material, and electromagnet means the field of which has its axis substantially parallel to but radially displaced from the rotor, said electromagnet field axis being substantially in a plane other than the plane of the rotor spin axis which is perpendicular to the gimbal axis of rotation, said electromagnet means being adjacent the rotor face having the magnetic material secured thereto whereby excitation of said electromagnet means exerts a torque which tends to twist said bar and the current drawn by the electromagnet means is modulated as a function of the rotor speed about its axis.

8. A rate gyroscope with self test features comprising gimbal means, a bar connected to said gimbal means having torsional stiffness against which said gimbal means is free to rotate, a rotor supported for rotation by said gimbal means, a plating of magnetic material on said rotor and discretely located in spaced apart relationship with the rotor axis of rotation whereby the reluctance at any point near the rotor varies cyclically as said rotor rotates, a plating of conductive material atop the plating of magnetic material so as to sandwich the magnetic material between the conductive plating and the rotor, and electromagnet means the field of which has its axis substantially parallel to but radially displaced from the rotor spin axis, said electromagnet field axis being substantially in a plane other than the plane of the rotor spin axis which is perpendicular to the gimbal axis of rotation, said electromagnet means being adjacent the rotor face having the magnetic material plated thereon, whereby excitation of said electromagnet means exerts a torque which tends to twist said bar and the current drawn by the electromagnet means is modulated as a function of the rotor speed about its axis.

9. The apparatus of claim 8 including pick-off means for detecting the amount of twist in said bar and detector means responsive to modulation of the current drawn by said electromagnet excitation to produce an indication of the rotor speed of rotation.

References Cited by the Examiner
UNITED STATES PATENTS
3,077,760   2/63   Packard _____ 73—1

ISAAC LISANN, *Primary Examiner.*